May 11, 1965

E. P. ODDY ETAL 3,182,481

HEAT EXCHANGER AND METHOD OF ITS MANUFACTURE

Filed Dec. 20, 1962

Inventors:
Edward P. Oddy and
Lubomyr Kinal
By: Thomas B. Hunter
Atty.

May 11, 1965 E. P. ODDY ETAL 3,182,481
HEAT EXCHANGER AND METHOD OF ITS MANUFACTURE
Filed Dec. 20, 1962 3 Sheets-Sheet 2
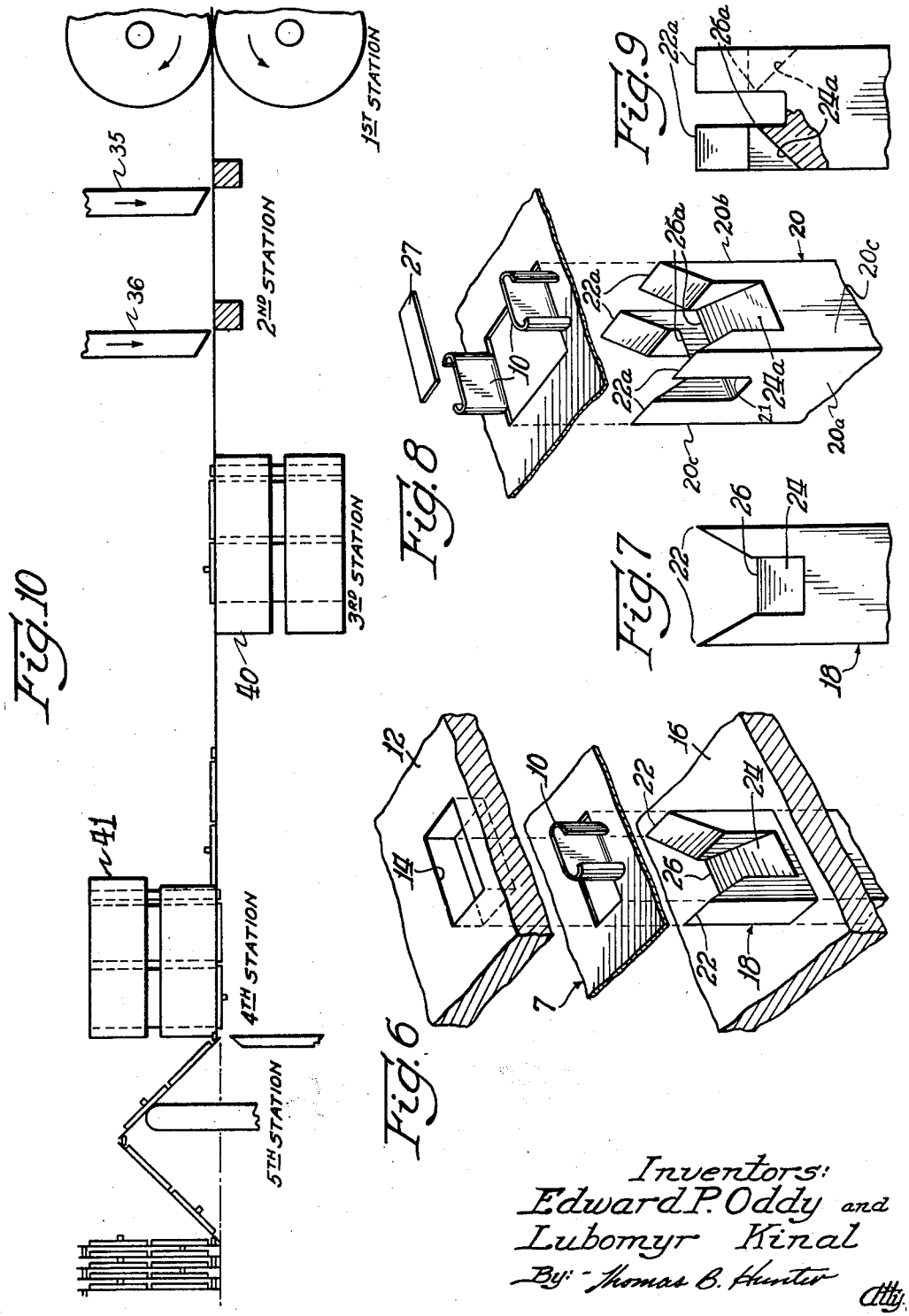
Inventors:
Edward P. Oddy and
Lubomyr Kinal
By: Thomas B. Hunter
Atty.

May 11, 1965  E. P. ODDY ETAL  3,182,481
HEAT EXCHANGER AND METHOD OF ITS MANUFACTURE
Filed Dec. 20, 1962  3 Sheets-Sheet 3
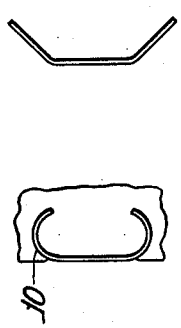
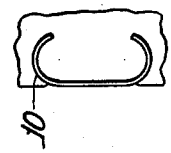
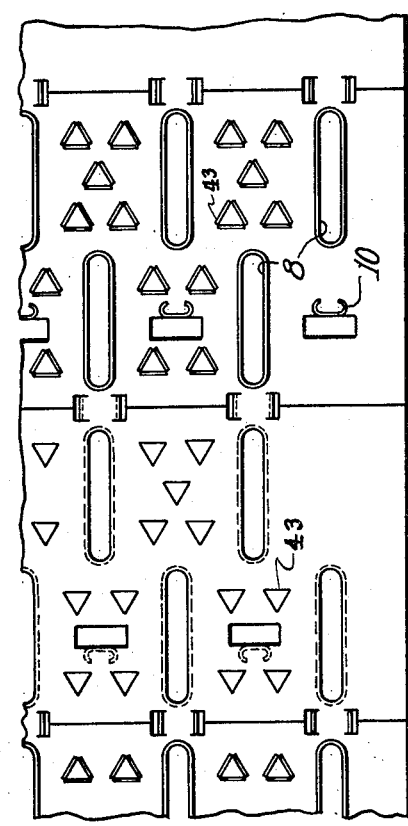
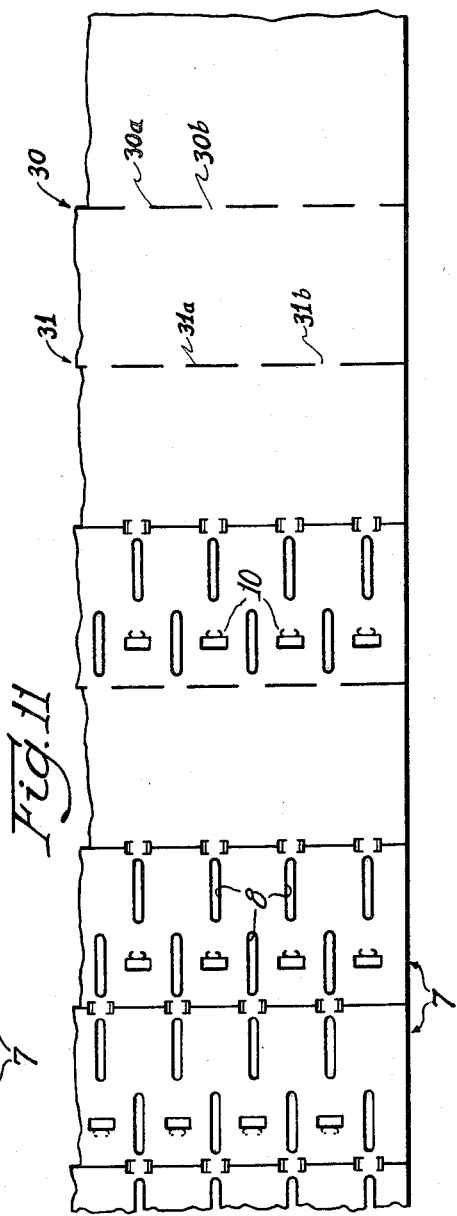
Inventors:
Edward P. Oddy and
Lubomyr Kinal
By: Thomas B. Hunter  Atty.

United States Patent Office 3,182,481
Patented May 11, 1965

3,182,481
HEAT EXCHANGER AND METHOD OF ITS
MANUFACTURE
Edward P. Oddy and Lubomyr Kinal, Detroit, Mich.,
assignors to Borg-Warner Corporation, Chicago, Ill., a
corporation of Illinois
Filed Dec. 20, 1962, Ser. No. 246,069
2 Claims. (Cl. 72—326)

This invention relates to a self-stacking fin structure for tube and fin heat exchanger and methods for manufacturing the same.

Self-stacking fins for radiators and the like are known, for example, in Krackowizer, U.S. Patent No. 2,047,207. Radiators of this type are assembled in a conventional manner by ararnging a plurality of cooling fins in generally parallel relation, inserting a series of fluid conducting tube elements through apertures provided in said fins, and then joining opposite ends of the tubes to header assemblies above and below the fin structure. The assembled unit is then soldered or brazed to join the several elements together into a unitary structure.

One particular problem present in prior art structures is the tendency of the fins to deform under pressure while being handled during assembly or in other stages of manufacture. A principal cause of this problem is that the spacer elements used to separate the fins from one another have not been rigid enough to withstand anything but the most careful handling. This problem is especially present in the production of radiator fins of the type employing a relatively thin metal fin stock on the order of .0025–.003 inch. Since the most acceptable fin stock must necessarily have a high coefficient of thermal conductivity, the choice of materials is usually either copper or aluminum, both of which are easily deformed.

It is, therefore, a principal object of the present invention to provide an improved tube and fin heat exchanger including fins having self-stacking capabilities and which may be readily adapted to an automated process of manufacture.

It is another object of the invention to provide an improved method of manufacturing tube and fin heat exchangers, either in a continuous process or by utilizing individual fin elements.

It is another object of the invention to provide an improved sheet metal punch adapted to cut and form spacing lugs on heat exchanger fins utilizing one stroke with respect to the fin.

Other and more particular objects and advantages of the present invention will be apparent from the following detailed description and the appended drawings, wherein:

FIGURE 6 is an isometric view of a punch and die assembly employed to form the single self spacers illustrated in FIGURES 2, 3, and 4;

FIGURE 7 is a detailed view of the male punch element used in the assembly of FIGURE 6;

FIGURE 8 is a view of a punch assembly used to form the self spacers illustrated in FIGURE 5;

FIGURE 9 is a detailed elevational view of the male punch of FIGURE 8;

FIGURE 10 is a schematic illustration of a continuous manufacturing procedure for assembly of the fin stock;

FIGURE 11 is a top plan view, partly schematic, of the assembly process, at various stages, and is related to FIGURE 10;

FIGURE 12 is a detailed top plan view of the fin stock prior to the folding operation;

FIGURE 13 is the preferred configuration of the spacer lug as viewed along lines 13—13 in FIGURE 3; and FIGURES 14, 15, and 16 illustrate alternate embodiments of the spacer elements.

Figure 1:
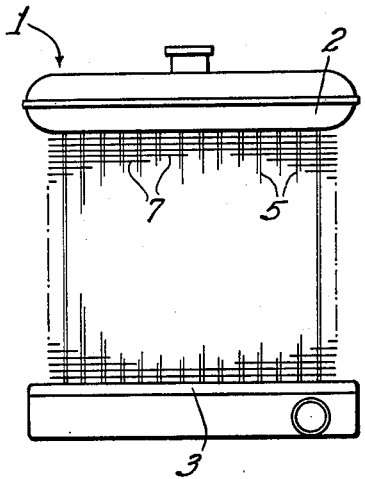
FIGURE 1 is a front elevational view of a heat exchanger constructed in accordance with the principles of the present invention.

Referring now to FIGURE 1, a heat exchanger generally indicated by the numeral 1 is shown having supply and receiving headers 2 and 3 interconnected by a plurality of tubes 5. The tubes, in a preferred embodiment, are of the flat type to reduce the resistance to air flow through the unit although it should be understood that they may have any cross-sectional configuration desired. Arranged parallel to the headers 2 and 3 are a plurality of fin elements 7 having apertures 8, FIGURE 2, for the reception of the tubes 5. In order to space the fin elements to afford the self-stacking capability a plurality of spacers or lugs 10 are provided, said spacers being formed from the fin sheets by punching out or extruding a small, rectangular shaped section of said sheet and bending the same to a position perpendicular to the plane of the fin. Each tube aperture 8 includes a surrounding flange to insure a more secure connection between the fins and the tubes. The fins may be connected to the tubes in any well known manner, but it is expeditious to use a soldering or brazing process.

Figure 2:
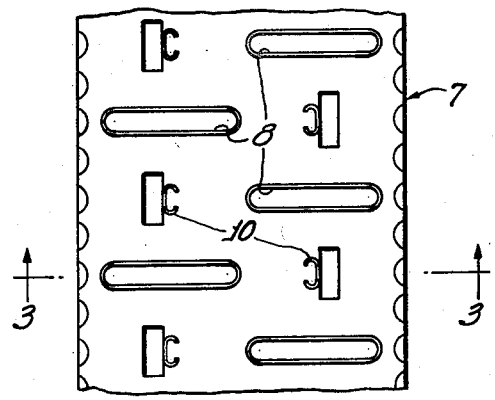
FIGURE 2 is a top plan view of a portion of a heat exchanger fin element used in the heat exchanger illustrated in FIGURE 1.

As shown in FIGURE 2, each fin element includes a series of spaced elongated tube apertures 8 arranged in rows running lengthwise of the fin. The tube apertures in one row are preferably staggered with respect to the other row to increase the effective area of heat exchange. Referring now in more detail to the tube spacers, each said spacer is formed by cutting an aperture in a strip of fin stock such that the material in the aperture is not severed completely from the fin stock and by bending or extruding the unsevered aperture material upwardly or downwardly with respect to the strip. The edges of each spacer are curled back or convoluted toward each other so that it provides one edge integrally connected to the fin itself and another edge adapted to contact the fin element immediately above or below it. A very important aspect of the present invention consists in the curling of the outer ends of the spacer element around toward each other. By means of this feature an extremely rigid element is formed which resists deformation.

In the embodiment shown in FIGURE 2, the spacer elements are positioned between adjacent tube apertures in each row so that the spacers are staggered with respect to each other. By positioning each spacer element immediately in front of one of the tubes, the resistance to flow caused by the spacer elements is not significantly greater than that caused by the tubes themselves. While not required, it has been found to be desirable to provide turbulizer elements spaced around each fin spacer. These turbulization elements form no part of the present invention and are to be regarded as purely optional.

Figure 4:
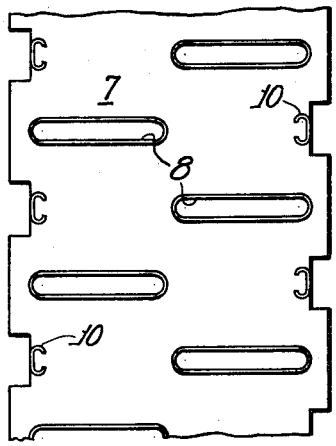
FIGURE 4 illustrates a second embodiment of a fin element.

As shown in FIGURE 4, an alternative design may include the spacer elements formed by punching the edge of the fin stock so that the spacer elements are spaced slightly inwardly from the edge. Various combinations of the edge design and the design shown in FIGURE 2 are contemplated. For example, the spacers might be placed at random throughout the available space not taken up by the tube apertures. The spacers, moreover, may be oriented longitudinally or transversely with respect to the fin or may be located at any angle with respect to the longitudinal axis of said fin element. It is further contemplated that the edge spacers (FIGURE 4) may be combined with the centrally disposed spacers (FIGURE 2) and may include various combinations of the randomly oriented spacers.

Figure 5:
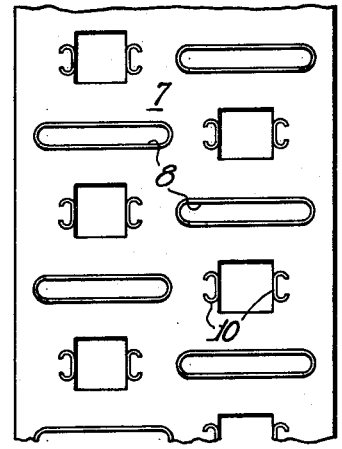
FIGURE 5 illustrates a third embodiment of a fin element.

FIGURE 5 illustrates a third embodiment of a spacer element which comprises a double spacer element having lugs arranged in pairs. By using a special punch, to be described below, both lugs are formed by a single punching operation.

Figure 3:
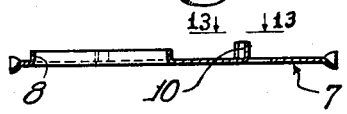
FIGURE 3 is an end view of the portion of a fin element taken along section lines 3—3 of FIGURE 2.

In FIGURES 6 and 7 a punch assembly adapted to form the single lug spacer elements shown in FIGURES 2, 3, and 4 is disclosed. This punch assembly includes a die plate 12 having a rectangular opening 14 extending therethrough, a base plate 16, and a punch 18 carried by said base plate extending perpendicular to said base plate. A conventional stripper plate (not shown) may be provided to facilitate withdrawal of the punch from the fin stock after the spacer element has been formed. The punch 18, shown in greater detail in FIGURE 6, comprises a bifurcated member having a pair of sharp cutting prongs 22 on opposite sides thereof and face 24 sloping downwardly from a transversely extending cutting edge 26. As the punch element is forced through the fin stock, the pair of cutting prongs 22 cut the strip at opposite ends of an imaginary rectangular section in the strip. As the punch is further extended through the strip, the transversely extending cutting edge 26 engages the strip cutting the third side from the rectangular element. Further movement of the punch causes the spacer element to be engaged by the sloping face 24 and is bent upwardly from the plane of the strip. Throughout this entire operation, the edges of the spacer element are bent inwardly toward each other to provide the configuration discussed above having improved rigidity characteristics. This punch element results in the spacer element being produced, i.e., pierced and formed with a single tool and with a single stroke of said tool.

The punch assembly employed for forming the double lug spacer element (FIGURE 5) is illustrated in FIGURES 8 and 9. The double lug punch design, which may be regarded as a paired set of single lug punches, comprises a punch body 20 having front, rear, and side faces 20a, 20b, and 20c respectively. A slot 21 extending through one end of the punch body 20 from the front face 20a to the rear face 20b divides the end of the punch body into two substantially identical single lug punches each of which includes a bifurcated member 27 having a pair of spaced cutting prongs 22a, a transversely extending cutting edge 26a, and a face 24a sloping downwardly from said cutting edge to the side faces of the punch body. The operation of the punch is substantially the same as that described above in connection with the single lug punch, the only difference being that a slug or blank 27 is formed between the two transversely extending cutting edges 26a as the spacer lugs 10 are bent upwardly from the plane of the strip to positions on opposite sides of the aperture formed by the punch.

FIGURE 10 illustrates, in diagrammatic form, a continuous process for manufacturing the fin assemblies of the present invention. FIGURES 11 and 12 which illustrate the strip of fin stock at various stages corresponding to operations performed during the manufacturing process may also be referred to for a complete understanding of the process.

Referring first to FIGURE 10, a continuous strip of thin metal fin stock is fed from a first station, where it is stored in a roll or any other convenient manner, and delivered to a second station where a plurality of longitudinally spaced groups of slits 30, 31 (FIGURE 11) are formed therein. This operation may be performed by a plurality of reciprocating knives 35, 36.

Each group of slits comprises a series of spaced, co-aligned individual slits 30a, 31a running transversely from one edge of the strip toward the other so as to provide a series of unsevered portions 30b, 31b between the ends of the slits. In a preferred embodiment, the slits of one group are staggered or offset with respect to the slits of an adjacent group so that the unsevered portions are similarly staggered.

After the slits are formed, the fin stock is fed to a third station which is provided with a die press 40. The operation of the die press is intermittent and in timed relation with respect to the movement of the fin stock so that the die press performs its operations on alternate areas between adjacent groups of slits. The first die press 40, arranged so that the punches and other forming elements move upwardly into the strip, carries out the following operations: (1) The tube apertures 8 are formed so that a narrow flange surrounding each aperture extends upwardly from the plane of the strip; (2) The spacer elements, which may be of any previously described design, are formed so that these also extend upwardly from the plane of the strip; and (3) A series of relatively short, longitudinally extending slits are provided, each said slit intersects the terminal portions of the transversely extending slits to provide a series of integral tie elements joining adjacent sections of the fin stock. These tie elements may be formed by a double pronged punch element similar to that shown in FIGURES 6 and 7 so as to obtain a convoluted reinforcing edge similar to those on the spacing lugs.

At a fourth station, the same operations performed at the third station are repeated by die press 41, but the die press punching and cutting elements all operate downwardly on the fin stock on the remaining alternate areas thereof. Thus, the spacer elements, the tube aperture flanges, and the tie elements alternately extend downwardly and upwardly from the plane of the strip throughout its length.

At a fifth station, the strip is bent alternately in opposite directions along the lines coincident with the transversely extending slits to form a corrugated or pleated pattern with the tube apertures in the respective fin plates coaxially arranged. Since alternate areas are provided with oppositely extending tube flanges and spacing lugs, after the strip is folded, the flanges and lugs will all extend in the same direction. After the fin plates have been gathered and formed into the compressed arrangement shown at the left of FIGURE 10, the tubes are inserted through the coaxially arranged tube apertures, the headers are connected to the opposite ends of the tube apertures, and then the assembly is bonded together in a unitary construction by brazing, soldering, or some equivalent method.

FIGURE 12, a detailed plan view of a section of the strip just prior to the folding operation, illustrates the optional turbulizer elements 43. The latter merely comprise small polygonal shaped apertures, formed with ragged edges, said edges extending generally perpendicular to the plane of the fin plates. The ragged edges disrupt the flow of air past the fin plates and prevent laminar flow of air past said plates thereby increasing the heat exchange efficiency of the unit.

Several alternate embodiments of the spacer elements and tie elements are illustrated in FIGURES 14, 15, and 16.

What is claimed is:

1. A sheet metal punch adapted to form an upwardly extending lug element on a thin metal sheet in a single stroke with respect to said sheet, said lug having convoluted edges comprising a bifurcated body member having a substantially rectangular cross section; a pair of cutting prongs projecting from said body member, said prongs presenting spaced, parallel cutting edges adapted to cut said metal sheet; means defining a transversely extending cutting edge and a face sloping downwardly from said transversely extending edge.

2. A sheet metal piercing implement adapted to form a pair of spaced, integral lugs on a thin metal sheet, said lugs extending generally perpendicular to the plane of said sheet and having convoluted edges comprising a body member having front, rear, and side faces; means defining a slot extending through said body member from said front face to said rear face, said slot dividing said body member into two substantially identical lug forming punches, each having a pair of parallel, spaced cutting edges, said edges being positioned adjacent said front face and said rear face respectively; means providing a pair of transversely extending metal cutting edges on opposite sides of said slot; and faces sloping downwardly from said transversely extending cutting edges to the side faces of said body member.

References Cited by the Examiner

UNITED STATES PATENTS

| | | | |
|---|---|---|---|
| 654,607 | 7/00 | Colborne | 153—2 |
| 1,175,697 | 3/16 | Braun | 153—2 |
| 2,091,593 | 8/37 | Herz | 165—151 |
| 2,264,520 | 12/41 | Gleason | 153—2 |
| 2,297,948 | 10/42 | Eisenhauer | 153—2 |
| 2,558,952 | 7/51 | Hayward | 29—157.3 |
| 2,816,738 | 12/57 | McElgin | 165—151 |
| 2,994,123 | 8/61 | Kritzer | 29—157.3 |

CHARLES W. LANHAM, *Primary Examiner*.

CHARLES SUKALO, *Examiner*.